United States Patent
Pötsch

(10) Patent No.: US 7,388,577 B2
(45) Date of Patent: Jun. 17, 2008

(54) DISPLAY APPARATUS WITH A TOUCH-SENSITIVE LAYER AND AN ANTIREFLECTION LATTICE

(75) Inventor: Edmund Pötsch, Königsbrunn (DE)

(73) Assignee: Fujitsu Siemens Computers GmbH, München (DE)

( * ) Notice: Subject to any disclaimer, the term of this patent is extended or adjusted under 35 U.S.C. 154(b) by 394 days.

(21) Appl. No.: 10/524,445

(22) PCT Filed: Aug. 13, 2003

(86) PCT No.: PCT/DE03/02727

§ 371 (c)(1),
(2), (4) Date: Feb. 11, 2005

(87) PCT Pub. No.: WO2004/021051

PCT Pub. Date: Mar. 11, 2004

(65) Prior Publication Data

US 2005/0259082 A1    Nov. 24, 2005

(30) Foreign Application Priority Data

Aug. 13, 2002 (DE) ................. 102 37 119

(51) Int. Cl.
*G06F 3/041* (2006.01)

(52) U.S. Cl. .................. 345/173; 341/34

(58) Field of Classification Search .......... 345/87, 345/105, 173, 174, 178; 341/34; 349/12; 178/18.06

See application file for complete search history.

(56) References Cited

U.S. PATENT DOCUMENTS

| 4,553,820 | A |   | 11/1985 | Harada |
|-----------|---|---|---------|--------|
| 5,647,152 | A | * | 7/1997  | Miura ............. 40/541 |
| 5,790,107 | A | * | 8/1998  | Kasser et al. ....... 345/174 |
| 6,078,274 | A | * | 6/2000  | Inou .................. 341/34 |
| 6,239,778 | B1| * | 5/2001  | Palffy-Muhoray et al. .... 345/87 |
| 6,456,279 | B1| * | 9/2002  | Kubo et al. ......... 345/173 |
| 2002/0000979 | A1 | * | 1/2002 | Furuhashi et al. ..... 345/173 |
| 2002/0075557 | A1 | * | 6/2002 | Zhang et al. .......... 359/321 |
| 2004/0189612 | A1 | * | 9/2004 | Bottari et al. ........ 345/173 |

FOREIGN PATENT DOCUMENTS

| CN | 1272922 A    | 6/1998  |
| DE | 100 11 433 A1 | 10/2000 |
| JP | 63 070801 A  | 3/1988  |
| WO | WO 99/63394  | 12/1999 |

* cited by examiner

*Primary Examiner*—Chanh D. Nguyen
*Assistant Examiner*—Pegeman Karimi
(74) *Attorney, Agent, or Firm*—Cohen Pontani Lieberman & Pavane LLP

(57) ABSTRACT

Abstract of the Disclosure A display apparatus having a display layer (2) and a touch-sensitive layer (3) running parallel thereto. An antireflection lattice is provided which is arranged on the touch-sensitive layer (3), the lattice elements being able to move toward one another or having a touch sensitivity which is independent of other lattice elements.

16 Claims, 5 Drawing Sheets

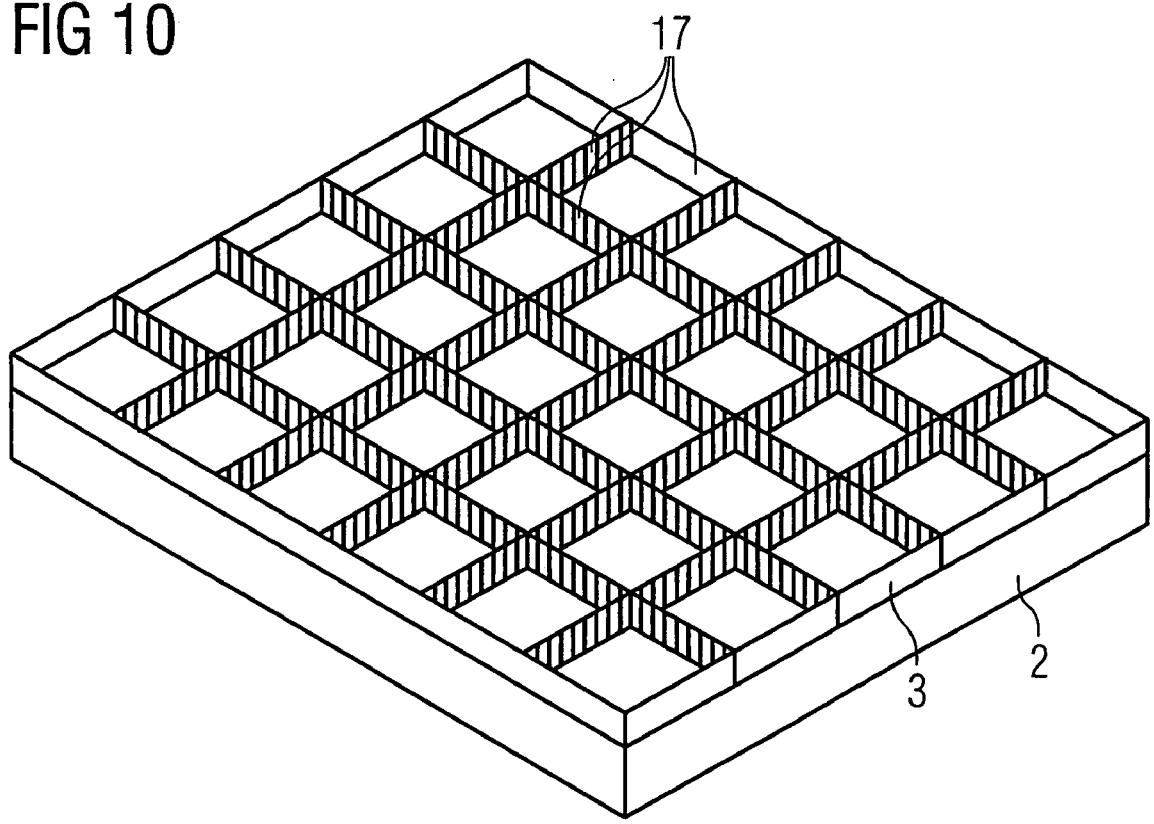

DISPLAY APPARATUS WITH A TOUCH-SENSITIVE LAYER AND AN ANTIREFLECTION LATTICE

RELATED APPLICATIONS

This is a U.S. national stage of application No. PCT/DE2003/002727, filed on 13 Aug. 2003.

This patent application claims the priority of German patent application no. 102 37 119.9 filed 13 Aug. 2002, the disclosure content of which is hereby incorporated by reference.

FIELD OF THE INVENTION

The invention relates to a display apparatus having a display layer and a touch-sensitive layer running parallel thereto.

BACKGROUND OF THE INVENTION

Such display apparatuses are used when it is necessary not only to display information graphically but also to use the apparatus for input. Such a display apparatus is useful particularly when using graphical user interfaces for operating systems or application programs. In these cases, functions are activated by buttons, in which case either the buttons can be clicked on with a cursor, for example using a mouse, or else the appropriate function can be activated by touching the display apparatus directly. Such display apparatuses are often called touchscreens.

Since such display apparatuses are able to save an input unit, display apparatuses of this kind are used in preference for small portable appliances, for example "handhelds" or PDAs. Particularly in mobile operation, however, the problem arises that there is a relatively high level of ambient brightness, and reflections appear on the display apparatus which significantly impair the legibility of the display apparatus.

From cathode ray tube units, where the problem of reflection likewise arises, it is known practice, in order to avoid reflections on the screen surface, to arrange a lattice in front of the screen, this usually being a fine-meshed wire netting, and this means that although displayed information can still be easily seen by an observer, obliquely incident ambient light can no longer cause any reflections.

In touch-sensitive display apparatuses, such wire netting or a similar apparatus cannot be used, because the relatively rigid structure means that even touching it with a relatively pointed object such as a pen would result in a broad pressure area, which can result in incorrect inputs. Even when the touch-sensitive layer has a high resolution, precise work is no longer possible.

Another known possibility for avoiding disruptive reflections is to roughen the surface pointing in the direction of an observer by starting to etch it, for example. A drawback of this solution is that the scatter effect does not just affect incident ambient light, but rather likewise affects the light which individual pixels on the display layer emit and scatter, and hence the sharpness of the image is reduced.

SUMMARY OF THE INVENTION

One object of the invention is to provide a display apparatus which has a touch-sensitive layer and which nevertheless has protection against surface reflections from ambient light.

This and other objects are attained in accordance with one aspect of the present invention directed to a display apparatus having a display layer and a touch-sensitive layer running parallel thereto. The side of the touch-sensitive layer which is remote from the display layer has an antireflection lattice comprising lattice elements which can move toward one another.

Another aspect of the present invention is directed to a display apparatus having a display layer and a touch-sensitive layer running parallel thereto. That surface of the touch-sensitive layer which is remote from the display layer has a lattice-like surface texturing, the lattice spacing being matched to the pixel spacing on the display layer such that the ratio of the lattice spacing to the pixel spacing is whole-numbered.

The whole-numbered ratio of the lattice spacing to the pixel spacing ensures that the light emitted by pixels on the display layer is not scattered, but rather reaches the observer directly. The lattice forms more or less microscopic channels. Obliquely incident light, on the other hand, is reflected or absorbed by the lattice elements.

Yet another aspect of the present invention is directed to a display apparatus having a display layer and a touch-sensitive layer running parallel thereto. The touch-sensitive layer contains lattice elements, the lattice spacing being matched to the pixel spacing on the display layer such that the ratio of the lattice spacing to the pixel spacing is whole-numbered.

In the case of such an embodiment, the lattice elements which prevent reflections have already been integrated into the touch-sensitive layer.

Still another aspect of the present invention is directed to a display apparatus comprising a display layer and a touch-sensitive layer running parallel thereto, wherein the touch-sensitive layer comprises strip-like lattice elements arranged in lattice form, and touch sensors integrated into nodes of the lattice. In such an embodiment, the touch-sensitive components and the antireflection components need not be separate units, but rather the same elements can perform functions both for avoiding reflections and for producing the touch sensitivity.

In a display apparatus of the type mentioned at the outset, it is advantageous if the lattice elements are of strip-like design, the lattice elements being able to move toward one another at nodes of the lattice. The strip-like configuration ensures a good antireflection behavior.

It is particularly advantageous if the angle between the lattice elements and the touch-sensitive layer is adjustable. The lattice elements mean that the viewing direction parallel to the lattice elements is highly preferable to an oblique viewing angle. A changeable angle between the lattice elements and the touch-sensitive layer allows the preferred viewing direction to be adjusted in line with the user's wishes.

Another advantageous configuration of the first solution provides for the antireflection lattice to be removable. In the case of the third solution mentioned, where the touch-sensitive layer contains lattice elements, it is advantageous for the lattice elements to have liquid crystals. This means that the antireflective behavior can be turned off and turned on when necessary.

The latter solution advantageously provides for electrical conductors running parallel to the display layer to be integrated into the lattice elements and for the lattice elements to be made of an elastic material, with means being provided for evaluating capacitive, inductive or resistive characteristic values for two electrical conductors from different lattice elements.

Further advantageous configurations of the invention are specified in the subclaims.

BRIEF DESCRIPTION OF THE DRAWINGS

FIG. 10 shows a display apparatus based on the invention with controllable lattice elements.

DETAILED DESCRIPTION OF THE DRAWINGS

Figure 1:
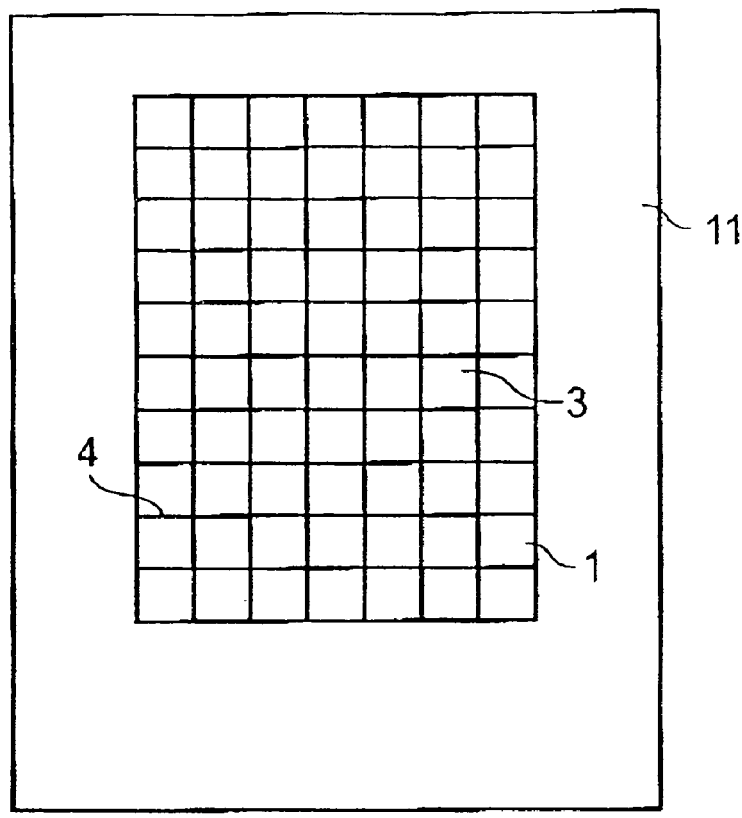
FIG. 1 shows a PDA with a display apparatus based on the invention.

FIG. 1 shows a PDA (Personal Digital Assistant) 11 with a display apparatus 1 based on the invention. The display apparatus 1 is of touch-sensitive design and, to this end, has a touch-sensitive layer 3. In the symbolic illustration in FIG. 1, there is also an antireflection lattice 4 which is suitable for eliminating disruptive reflections.

Figure 2:
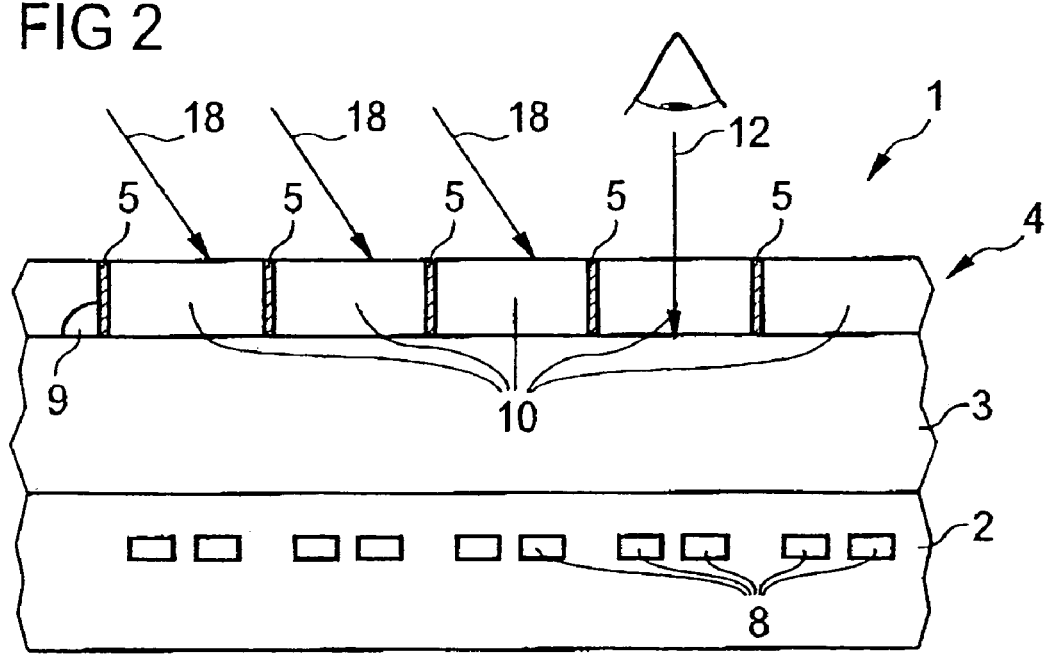
FIG. 2 shows a schematic illustration of a first exemplary embodiment of a display apparatus based on the invention.

FIG. 2 shows the display apparatus from FIG. 1 in a more detailed illustration. As can be seen from FIG. 2, the antireflection lattice 4 comprises a multiplicity of lattice elements 5. These are at a predetermined angle 9 on a touch-sensitive layer 3. Preferably, the angle 9 is 90°. The lattice elements 5 form microscopic channels 10 through which an observer looks onto the touch-sensitive layer and onto the display layer 2 underneath. The display layer includes an array of pixels 8. In order for good visibility to be ensured, the lattice elements 5 are thus oriented parallel to the viewing direction 12. Incident light 18 from the side is absorbed by the lattice elements 5 and as a result only a small proportion thereof reaches the at least partially reflective surface of the touch-sensitive layer 3 or of the display layer 2.

Particularly in the case of small portable appliances such as the PDAs shown in FIG. 1, it is easy to hold the appliance respectively such that the viewing direction is at right angles to the display apparatus 1. In the case of larger appliances such as Particularly in the case of small portable appliances such as the PDAs shown in FIG. 1, it is easy to hold the appliance respectively such that the viewing direction is at right angles to the display apparatus 1. In the case of larger appliances such as Notebooks or permanently installed flat screens, however, it is not always possible or not always easy to orient the display apparatus 1 with respect to the user in optimum fashion. It is therefore advantageous if the lattice elements 5 are not rigid but rather are able to move such that their angle 9 with respect to the touch-sensitive layer 3 can be altered. This can be achieved, for example, by the use of strip-like lattice elements 5 with slots at the lattice nodes 13, such that the strip-like lattice elements 5 running in one direction of the lattice are not connected to the strip-like lattice elements 5 running orthogonal to them. In the case of an embodiment with an adjustable angle for the lattice elements, optimum orientation can be achieved by means of user setting or automatically on the basis of the incident ambient light. To this end, by way of example, a sensor may be provided which measures the angle of incidence of ambient light and uses appropriate control apparatuses to actuate the lattice elements 5 such that they are at an optimum angle.

The lattice elements 5 are either partially transparent or nontransparent. To attain a satisfactory action, the material of the lattice elements 5 should be light-absorbent or should form a light-absorbent surface. The lattice elements 5 could, for example, be made of some conductive polymer material, which can be printed directly on the surface of the touch-sensitive layer 3.

For the quality of the display apparatus 1, it is necessary for the lattice spacing between lattice elements 5 to be matched to the pixel spacing of the pixel elements 8 on the display layer 2. Otherwise, the "Moiré effect" may arise. This occurs when fractional-numbered spacing ratios mean that lattice elements 5 are situated above pixel elements 8 in particular regions, while in other regions the lattice elements 5 are situated precisely between two pixels. The Moiré effect can be avoided if the ratio of lattice spacing to pixel spacing is whole-numbered. In FIG. 2, the lattice spacing has been chosen such that it is twice the size of the pixel spacing. Two pixels 8 therefore have one lattice element 5.

Figure 3:
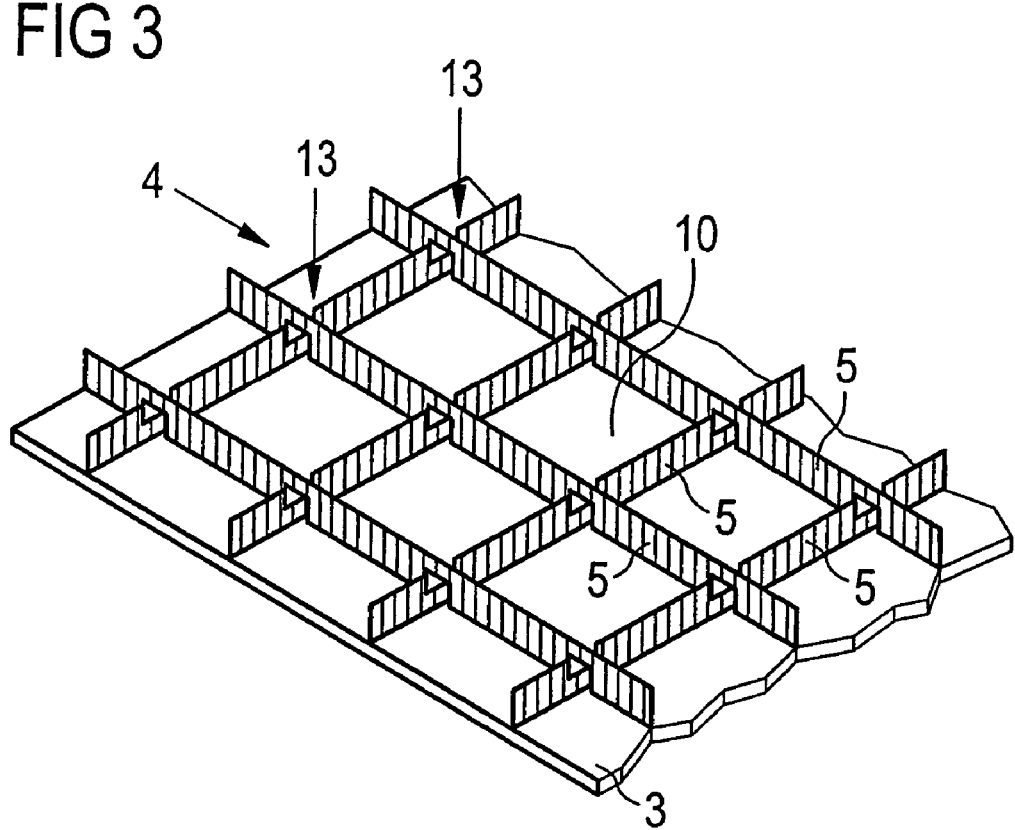
FIG. 3 shows a three-dimensional illustration of lattice elements from the exemplary embodiment in FIG. 2, FIGS. 4 to 6 show variants of the embodiment of lattice elements.

FIG. 3 shows a three-dimensional schematic illustration of the arrangement of the lattice elements 5. The slots in the strip-like lattice elements 5 at lattice nodes 13 ensure that the lattice elements are flexible with respect to one another. This is important so that pressure on the lattice elements 5 is respectively transferred to the underlying location on the touch-sensitive layer 3.

Figure 4:
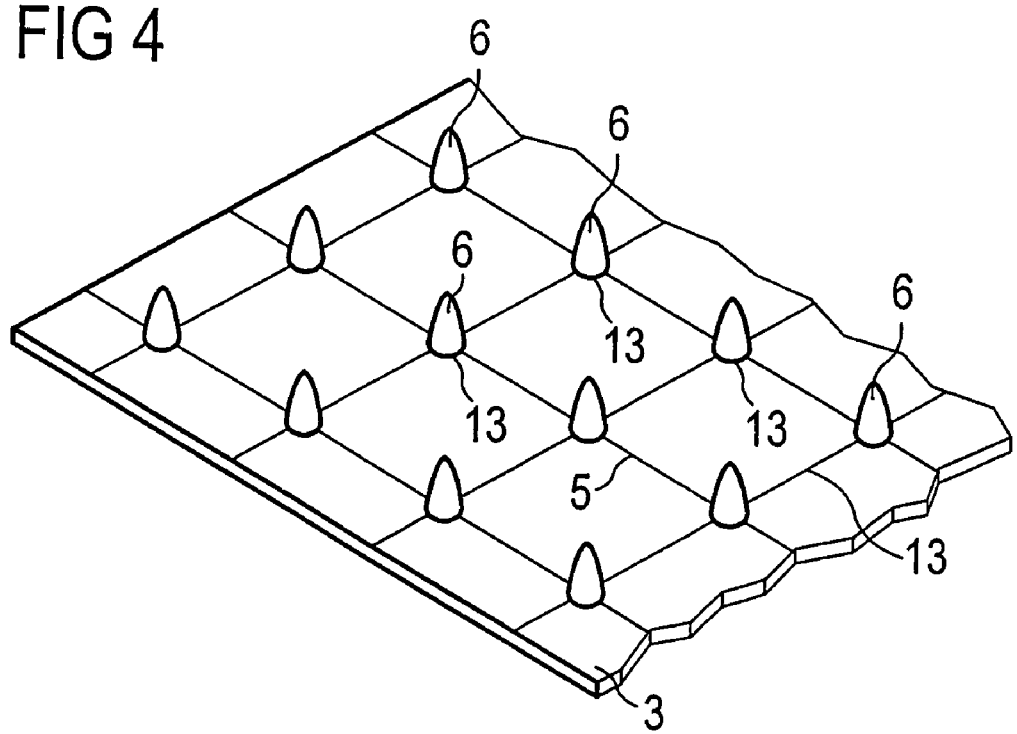
Figure 5:
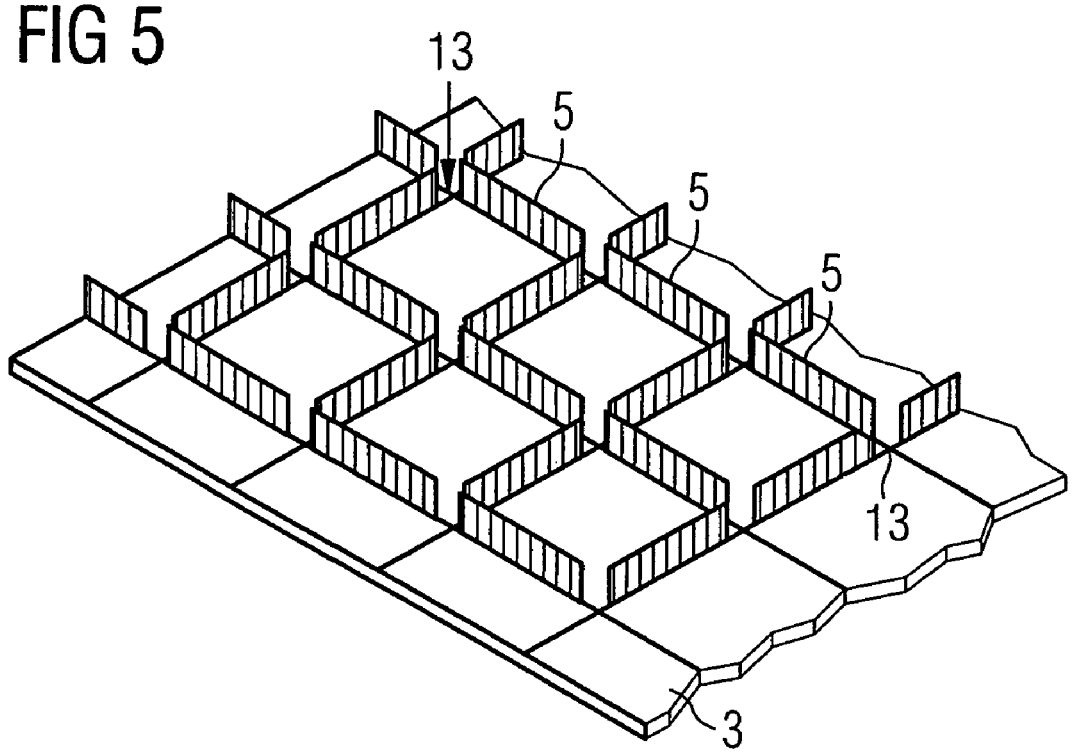
Figure 6:
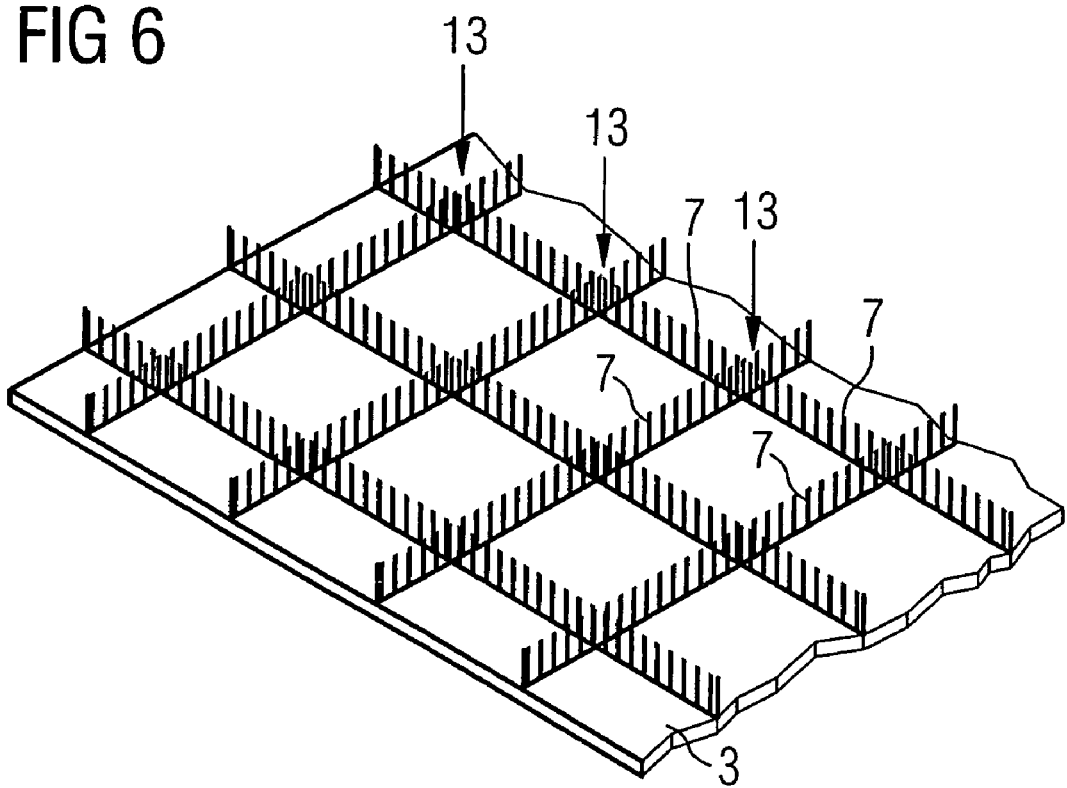

FIGS. 4 to 6 show alternative configurations of the antireflection lattice 4. In the illustration in FIG. 4, studs are provided at the lattice nodes 13. This stud-like configuration ensures a very beneficial transfer of force to the touch-sensitive layer 3. If the studs are of an appropriate size and the lattice spacing is correspondingly small, an adequate antireflection action can be produced. For example, the height of the studs can be comparable to the lattice spacing.

In FIG. 5, there are likewise strip-like lattice elements 5, these being interrupted completely at the nodes 13. The width of the strips 5 can be reduced further, and hence it is not necessary for the strips to extend over the entire length between two nodes 13.

In the illustration in FIG. 6, there are bristle-like lattice elements 7. Such an embodiment of the lattice elements is suitable, above all, when the ratio of the lattice spacing to the pixel spacing is much greater than 1. In one configuration of lattice elements, in which only the lattice nodes 13 permit a touch to be detected, the resolution of the touch-sensitive layer 3 would therefore be very low. However, since each bristle is able to transfer a force exerted on it from above, it is possible to attain a good touch resolution even with a large lattice spacing.

Figure 7:
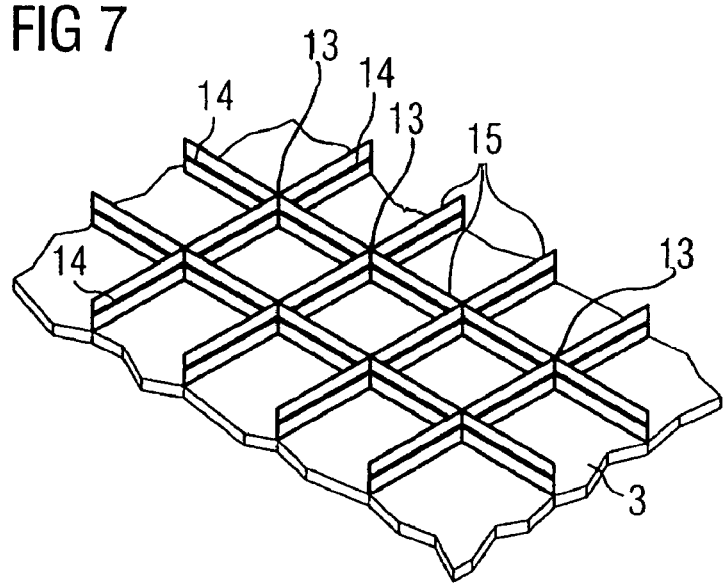
FIG. 7 shows a further exemplary embodiment with the touch-sensitive properties integrated into the lattice elements.

In the embodiment in FIG. 7, the functions of the touch-sensitive layer 3 and of the antireflection lattice 4 have been combined with one another. This is achieved by virtue of the lattice element 15 not only being of strip-like design, in order to develop an antireflection action, but rather also being touch-sensitive. This is achieved by virtue of the lattice elements 15 containing electrical conductors 14 which do not touch at the nodes 13 (this cannot be seen in FIG. 7). The specific evaluation of individual electrical conductors 14 means that it is possible to evaluate a change in the spacing between two electrical conductors 14 at individual nodes 13. This is because a change results in capacitive, inductive or resistive values changing. To this end, the lattice elements 15 need to be elastic so that the exertion of a pressure also results in a change in the spacing between two conductors.

Another possible way of combining the antireflection function and the touch sensor function is to use lattice elements such as those shown in FIG. 5, for example, and additionally to set up touch sensors at the nodes. This can be done merely by using a capacitively sensitive sensor element, for example, which is respectively arranged at a node 13. Capacitive sensor elements work by virtue of an object brought close altering the electrical field, which results in a change of capacitance for an electrode which represents the sensor element. This change of capacitance can now be evaluated.

Figure 8:
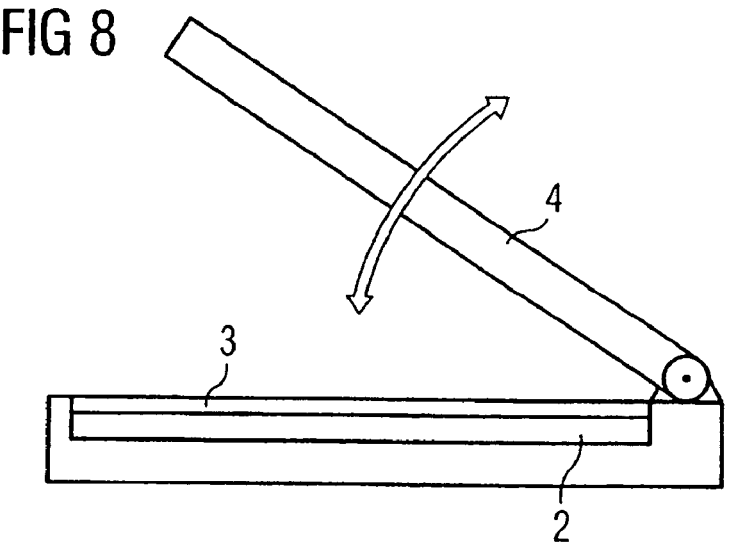
FIG. 8 shows a display apparatus based on the invention with a removable antireflection lattice.

FIG. 8 shows the possible way of connecting the antireflection lattice 4 pivotably to a housing which holds the touch-sensitive layer 3 and the display layer 2. In this way, the display apparatus can also be used without an antireflection lattice 4.

Figure 9:
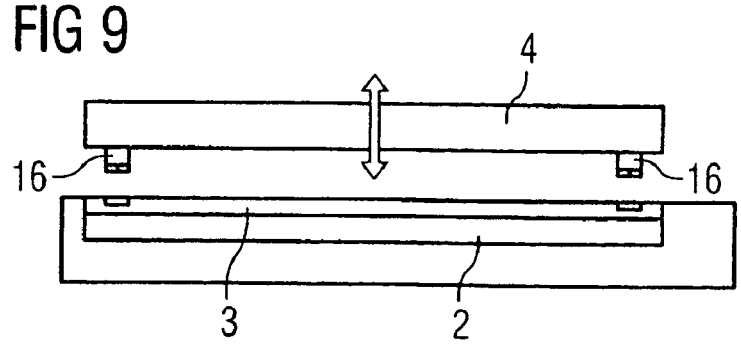
FIG. 9 shows the arrangement from FIG. 8 with a removable antireflection lattice.

FIG. 9 shows a similar configuration to that in FIG. 8, but the reflection lattice 4 can be mounted instead of being arranged pivotably on the housing. Positioning pins 16 ensure that the antireflection lattice is positioned such that the lattice elements do not disturb the light radiated by pixel elements on the display layer 2.

FIG. 10 shows an embodiment of a display apparatus based on the invention in which lattice structures have been incorporated into the touch-sensitive layer 3, for example through etching a grid structure into the touch-sensitive layer or doping the material used for the touch-sensitive layer 3. In this case, the lattice elements do not need to be flexible. The lattice elements may also be formed from liquid crystals or an electrochromic material contained in the touch-sensitive layer 3. In this case, the lattice elements can be turned on or off as required by applying an electrical field in the area of forming the lattice elements, e.g., by applying a conductive surface coating acting as electrodes on each side of the touch-sensitive layer 3 and applying an electrical charge to these electrodes. The applied electrical field results in a change of the optical properties of the electrochromic material, for example by changing from a transparent to an absorbing state. So as not to impede the display properties of the display layer, the lattice spacing should also be matched to the pixel spacing in this case.

When liquid crystal antireflection lattices are used, the optical orientation of the lattice elements can be adjusted by changing the orientation of the electrical field used to activate the liquid crystals, for example through rearranging the electrodes used to generate this field. In this case, the adjustment can be made either manually by the user or automatically on the basis of the level and/or angle of incident ambient light.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

The invention claimed is:

1. A display apparatus comprising:
a display layer;
a plurality of pixel elements arranged on the display layer; and
a touch-sensitive layer running parallel to the display layer;
wherein a side of the touch-sensitive layer which is remote from the display layer includes an antireflection lattice comprising first lattice elements extending in a first direction parallel to the display layer and second lattice elements extending in a second direction parallel to the display layer and orthogonal to the first direction, the first and second lattice elements intersecting at nodes of the lattice at which the first and second lattice elements can move with respect to one another, the first and second lattice elements forming a plurality of microscopic channels extending in a third direction orthogonal to the first and second directions, the plurality of channels being associated with the plurality of pixel elements for viewing the display layer in the third direction and absorbing or reflecting oblique incident light from the first or second directions.

2. The display apparatus as claimed in claim 1, wherein the first and second lattice elements are of strip-like design comprising slots at the nodes of the lattice, such that the first and second lattice elements are able to move with respect to one another at the nodes of the lattice.

3. The display apparatus as claimed in claim 1, wherein the first and second lattice elements are of bristle-like design.

4. The display apparatus as claimed in claim 1, wherein the lattice spacing is matched to a pixel spacing on the display layer such that the ratio of the lattice spacing to the pixel spacing is whole-numbered.

5. The display apparatus as claimed in claim 1, wherein an angle between the first and second lattice elements and the touch-sensitive layer is adjustable.

6. The display apparatus as claimed in claim 5, further comprising means for automatically adjusting the angle on the basis of the angle of incident ambient light.

7. The display apparatus as claimed in claim 1, wherein the first and second lattice elements comprise a light-absorbent material.

8. The display apparatus as claimed in claim 1, wherein the antireflection lattice is removable.

9. A display apparatus comprising:
a display layer;
a plurality of pixel elements arranged on the display layer; and
a touch-sensitive layer running parallel the display layer;
wherein the touch-sensitive layer comprises first lattice elements extending in a first direction parallel to the display layer and second lattice elements extending in a second direction parallel to the display layer and orthogonal to the first direction, the first and second lattice elements intersecting at nodes of the lattice at which the first and second lattice elements can move with respect to one another, the first and second lattice elements forming a plurality of microscopic channels in the touch-sensitive layer extending in a third direction orthogonal to the first and second directions, the plurality of channels being associated with the plurality of pixel elements for viewing the display layer in the third direction and absorbing or reflecting oblique incident light from the first or second directions, the lattice spacing being matched to a pixel spacing on the display layer such that the ratio of the lattice spacing to the pixel spacing is whole-numbered.

10. The display apparatus as claimed in claim 9, wherein the first and second lattice elements are made of liquid crystals disposed in the touch-sensitive layer.

11. The display apparatus as claimed in claim 9, wherein the first and second lattice elements comprise an electrochromic material.

12. The display apparatus as claimed in claim 10, further comprising:
   means for automatically adjusting the optical properties of the first and second lattice elements on the basis of the ambient light conditions.

13. A display apparatus comprising:
   a display layer; and
   a touch-sensitive layer running parallel to the display layer;
   wherein the touch-sensitive layer comprises strip-like lattice elements arranged in lattice form, and touch sensors integrated into nodes of the lattice;
   wherein the lattice elements comprise electrical conductors which run parallel to the display layer and do not touch at the nodes of the lattice, and the lattice elements comprise an elastic material, and means for evaluating the spacing of the conductors at nodes of the lattice.

14. The display apparatus as claimed in claim 13, wherein the touch sensors are capacitive sensor elements.

15. The display apparatus as claimed in claim 1, wherein the first and second lattice elements are of strip-like design interrupted completely at nodes of the lattice such that the first and second lattice elements are able to move with respect to one another at the nodes of the lattice.

16. A display apparatus comprising:
   a display layer;
   a plurality of pixel elements arranged on the display layer;
   a touch-sensitive layer running parallel to the display layer; and
   a further layer; comprising an antireflection lattice comprising first lattice elements extending in a first direction parallel to the display layer and second lattice elements extending in a second direction parallel to the display layer and orthogonal to the first direction, the first and second lattice elements intersecting at nodes of the lattice at which the first and second lattice elements which can move with respect to one another, the first and second lattice elements forming a plurality of microscopic channels in the touch-sensitive layer extending in a third direction orthogonal to the first and second directions, the plurality of channels being associated with the plurality of pixel elements for viewing the display layer in the third direction and absorbing or reflecting oblique incident light from the first or second directions, the further layer being mounted on top of the touch-sensitive layer on a side which is remote from the display layer and is separate from the touch-sensitive layer.

* * * * *